US008563115B2

(12) United States Patent
Lin et al.

(10) Patent No.: US 8,563,115 B2
(45) Date of Patent: Oct. 22, 2013

(54) PROTECTIVE COATINGS FOR SOLID INKJET APPLICATIONS

(75) Inventors: Liang-Bih Lin, Rochester, NY (US); Pinyen Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1378 days.

(21) Appl. No.: 12/189,838

(22) Filed: Aug. 12, 2008

(65) Prior Publication Data

US 2010/0040829 A1 Feb. 18, 2010

(51) Int. Cl.
*B32B 3/24* (2006.01)
*B05D 5/00* (2006.01)

(52) U.S. Cl.
USPC .............. 428/137; 427/466; 427/243; 347/47

(58) Field of Classification Search
USPC ...................... 428/137; 347/47; 427/466, 243
See application file for complete search history.

(56) References Cited

U.S. PATENT DOCUMENTS 3,689,571 A 9/1972 Regan et al.
3,894,992 A * 7/1975 Raynolds ...................... 524/598
3,981,807 A * 9/1976 Raynolds ..................... 252/8.61
4,565,867 A 1/1986 Thomas et al.
4,980,501 A 12/1990 Scheben
5,179,188 A 1/1993 Mercer et al.
5,212,496 A 5/1993 Badesha et al.
5,218,381 A 6/1993 Narang et al.
5,264,637 A 11/1993 Yoshida et al.
5,291,226 A 3/1994 Schantz et al.
5,721,363 A 2/1998 Canzi et al.
6,258,950 B1 7/2001 Van Wijck
6,294,704 B1 9/2001 Takaki et al.
6,313,357 B1 11/2001 Yamaguchi et al.
6,357,865 B1 3/2002 Kubby et al.
6,392,105 B1 5/2002 Yoshizawa et al.
6,410,808 B1 6/2002 Furukawa et al.
6,416,683 B1 7/2002 Klug et al.
6,579,980 B2 6/2003 Tjioe
6,677,492 B2 1/2004 Bieniarz et al.
7,034,179 B2 4/2006 Okazoe et al.
7,053,237 B2 5/2006 Okazoe et al.
7,161,025 B2 1/2007 Okazoe et al.
7,169,719 B2 * 1/2007 Mehta et al. ...................... 442/2
7,186,828 B2 3/2007 Guichard et al.
7,193,119 B2 3/2007 Nagai et al.
7,220,882 B2 5/2007 Porro et al.
7,265,222 B2 9/2007 Haddad et al.
7,312,288 B2 12/2007 Kinsho et al.
7,314,949 B2 1/2008 Goredema et al.
7,354,933 B2 4/2008 Patek et al.
2002/0101477 A1 8/2002 Hiroyuki et al.
2002/0123642 A1 9/2002 Koenig et al.
2003/0020785 A1 1/2003 Andrews
2005/0068368 A1 3/2005 Ishizuka et al.
2005/0285901 A1 12/2005 Nelson et al.
2007/0032627 A1 * 2/2007 Burleigh et al. ................ 528/60

FOREIGN PATENT DOCUMENTS

| | | | |
|---|---|---|---|
| DE | 42 07 624 | A1 | 9/1993 |
| EP | 0 249 048 | A2 | 12/1987 |
| EP | 0 849 392 | A2 | 6/1998 |
| JP | A-63-068685 | | 3/1988 |
| JP | A-10-183476 | | 7/1998 |
| JP | 2002-225274 | A | 8/2002 |
| JP | A-2004-509998 | | 4/2004 |

OTHER PUBLICATIONS

Office Action for Canadian Application No. 2,674,726, mailed Jul. 29, 2010.
Office Action issued in Canadian Patent Application No. 2,674,726, mailed Jul. 20, 2011.
EP Search Report for Application No. EP 09 16 6162, mailed Apr. 28, 2010.
Office Action issued in Canadian Patent Application No. 2,674,726, mailed Apr. 13, 2012.

* cited by examiner

*Primary Examiner* — William P Watkins, III
(74) *Attorney, Agent, or Firm* — Oliff & Berridge, PLC

(57) ABSTRACT

This disclosure provides an aperture plate coated with a composition comprising a fluorinated compound and an organic compound selected from the group consisting of a urea, an isocyanate and a melamine. This disclosure also provides a process of applying a coating composition to an aperture plate, comprising adding a fluorinated compound, an organic compound selected from the group consisting of a urea, an isocyanate and a melamine, and an optional catalyst together in a solvent to form a coating composition, applying the coating composition to a base film, and curing the base film. This disclosure also describes replacing the aperture plate with polyimide film, where the polyimide film is coated with the above-described coating composition before a laser cutting process.

19 Claims, No Drawings

PROTECTIVE COATINGS FOR SOLID INKJET APPLICATIONS

BACKGROUND

This invention relates to solid inkjet printheads. In inkjet printing, a printhead is provided, the printhead having at least one ink-filled channel for communication with an ink supply chamber at one end of the ink-filled channel. An opposite end of the ink-filled channel has a nozzle opening from which droplets of ink are ejected onto a recording medium. In accordance with the ink droplet ejection, the printhead forms an image on the recording medium. The ink droplets are formed as ink forms a meniscus at each nozzle opening prior to being ejected from the printhead. After a droplet is ejected, additional ink surges to the nozzle opening to reform the meniscus.

The direction of the ink jet determines the accuracy of placement of the droplet on the receptor medium, which, in turn, determines the quality of printing performed by the printer. Accordingly, precise jet directionality is an important property of a high quality printhead. Precise jet directionality ensures that ink droplets will be placed precisely where desired on the printed document. Poor jet directionality results in the generation of deformed characters and visually objectionable banding in half tone pictorial images. Particularly with the newer generation of thermal ink jet printers having higher resolution enabling printing at least 360 dots per inch, improved print quality is demanded by customers.

A major source of ink jet misdirection is associated with improper wetting of the front face of the printhead containing at least one nozzle opening. One factor that adversely affects jet directional accuracy is the accumulation of dirt and debris, including paper fibers, on the front face of the printhead. Another factor that adversely affects jet directional accuracy is the interaction of ink previously accumulated on the front face of the printhead with the exiting droplets. This accumulation is a direct consequence of the forces of surface tension, the accumulation becoming progressively severe with aging due to chemical degradation (including, for example, oxidation, hydrolysis, reduction (of fluorine), etc.) of the front face of the printhead. Ink may accumulate on the printhead front face due to either overflow during the refill surge of ink or the splatter of small droplets resulting from the process of ejecting droplets from the printhead. When accumulated ink on the front face of the printhead makes contact with ink in the channel (and in particular with the ink meniscus at the nozzle orifice), the meniscus distorts, resulting in an imbalance of forces acting on the ejected droplet. This distortion leads to ink jet misdirection. This wetting phenomenon becomes more troublesome after extensive use of the printhead as the front face either chemically degrades or becomes covered with dried ink film. As a result, gradual deterioration of the generated image quality occurs.

One way of avoiding these problems is to control the wetting characteristics of the printhead front face so that no accumulation of ink occurs on the front face even after extensive printing. Thus, in order to provide accurate ink jet directionality, wetting of the front face of the printhead is preferably suppressed. This can be achieved by rendering the printhead front face hydrophobic.

Conventionally, a solid inkjet printhead has been built with stainless steel plates etched chemically or punched mechanically. A solid printhead has also been built on a silicon substrate with microelectro-mechanical system (MEMS) technology. There has been significant effort recently to reduce the cost of solid inkjet printheads. One opportunity is to replace the stainless steel aperture plate with a polyimide aperture plate. For stainless steel material, the aperture was punched mechanically. Therefore, by replacing it with a polyimide film that can be laser cut, it is possible to eliminate issues with defects and limitations in the punched stainless steel. In addition, a polyimide aperture plate significantly reduces manufacturing costs as compared to the punched stainless steel plate. The hole size and size distribution are comparable to stainless steel aperture plates in a polyimide plate.

Polyimide is used in many electronic applications for its many advantages, such as high strength, heat resistant, stiffness and dimensional stability. In solid inkjet printheads, it can be used as an aperture plate for ink nozzles. However, without an anti-wetting or hydrophobic coating, the front face will flood with ink and the jetting cannot be done. But the high surface energy nature of the polymer can cause some issues. Therefore, protective coatings with low surface energy characteristics are key to long lasting devices.

For example, U.S. Pat. No. 5,218,381, incorporated herein by reference in its entirety, describes a coating comprising an epoxy adhesive resin such as EPON 1001F, for example, doped with a silicone rubber compound such as RTV 732. The coating can be provided in the form of a 24% solution of EPON 1001F and a 30:70 mixture of xylene and methyl iso-butyl ketone by weight doped with 1% by weight of RTV 732. Such a coating enables the directionality of an ink jet to be maintained for the printing lifetime of the printer. An adhesion promoter such as a silane component, for example, can also be included to provide a highly adherent, long lasting coating.

While laser ablated nozzle plates are able to provide excellent drop ejector performance, a practical problem in so forming the nozzle plates is that while polymer materials used for the nozzle plate, for example polyimides, are laser abatable with lasers such as excimer lasers, such polymers are not hydrophobic. It is thus necessary to provide a hydrophobic coating upon the surface of the nozzle plate to render the front face hydrophobic to improve the ink jet accuracy as discussed above. However, coating polyimide is not commonly done in industry. Polyimide is chemically and thermally stable, and many coating agents cannot easily form a thin and uniform coating on the surface.

U.S. Patent Application Publication No. 2003/0020785, which is incorporated herein by reference in its entirety, discloses a laser abatable hydrophobic fluorine-containing polymer coating.

Conventionally, the aperture surface would be coated with fluoropolymer for anti-wetting purposes. Without the anti-wetting coating, the front face of printhead will flood with ink and the ink cannot be jetted out of the nozzle. The coating process is performed by evaporating fluoropolymer in a high vacuum chamber at elevated temperature. It is a batch process with printheads loaded and unloaded to and from the chamber for the coating, which is an expensive process.

Fluorinated compounds like fluoropolymers, in particularly poly(tetrafluoroethylene) (PTFE), are used extensively in low surface energy protective coatings to achieve wear resistant and environmental stability. For certain applications, where micro-particles of PTFE are required for mixing with other resins/binders, residues flake off and discharge of the microparticles after wear and tear can be a severe issue. Homogeneous coatings comprised of low surface energy moieties are more desirable. Unfortunately, in order to gain enough integrity, the low surface energy material must be compatible and best chemically linked with other components. Moreover, proper adhesion of the protective coatings to the base polymer, polyimide, is also critical.

SUMMARY

In order to solve the above-identified problems, this disclosure provides an aperture plate coated with a composition comprising a fluorinated compound, such as fluoroalcohol, fluoroether, fluoroester and the like and an organic compound selected from the group consisting of a urea, isocyanate, and a melamine. Although not bound by any theory, it is believed that the fluorinated moiety provides low surface energy and the alcohol, ether or ester group chemically bonds, or cross-links, with the organic compound to form a condensation product.

This disclosure also provides a process of applying a coating composition to an aperture plate, comprising adding a fluorinated compound, an organic compound selected from the group consisting of a urea, an isocyanate, and a melamine, and an optional catalyst together in a solvent to form a coating composition, applying the coating composition to a base film, and curing the base film.

This disclosure also describes replacing a conventional stainless steel aperture plate with polyimide film, where the polyimide film is coated with the above-described coating composition before a laser cutting process. The coating composition can be done in a continuous process, eliminating the costly evaporation batch process. In addition, the coating process does not require the time-consuming vacuum pumping process that is typically needed for an evaporation process.

EMBODIMENTS

In embodiments, this disclosure provides an aperture plate coated with a composition comprising a fluorinated compound and an organic compound selected from the group consisting of a urea, an isocyanate and a melamine.

In embodiments, any fluorinated compound can be used. For example, a fluoroalcohol, a fluoroether, a fluoroester and the like may be used.

A fluorinated alcohol, or fluoroalcohol, can be used as the fluorinated compound. A fluoroalcohol is any hydrocarbon chain with an alcohol group and at least one fluorine atom. The hydrocarbon chain can be straight or branched, linear or cyclic, saturated or unsaturated, and can have any number of carbon atoms such as from 1 to about 50, or 2 to about 25, or 3 to about 20, or 4 to about 15 carbon atoms. The hydrocarbon chain can be unsubstituted (other than by halogen atoms) or substituted with one or more other groups, as desired. For example, a fluoroalcohol could be a compound represented by Formula 1:

$$R_f(CH_2)_aOH \qquad \text{Formula 1}$$

wherein $R_f$ is a perfluorocarbon of 1 to about 20 carbon atoms and a is 0 to 6.

The perfluorocarbon represented by $R_f$ in Formula 1 is a hydrocarbon group of 1 to about 20 carbon atoms, where at least one hydrogen atom is replaced with a fluorine atom. The hydrocarbon group in the perfluorocarbon can be linear, branched, saturated or unsaturated. Any number of fluorine atoms can replace any number of corresponding hydrogen atoms of a carbon atom. For example, 1 to about 40 fluorine atoms could replace 1 to about 40 hydrogen atoms if there are, for example, 1 to about 20 carbon atoms.

An example of a specific fluoroalcohol is Zonyl® BA by DuPont®, represented by the Formula $F(CF_2CF_2)_nCH_2CH_2OH$, wherein n is 2 to 20. Zonyl® BA, has acceptable solubility in a ketone solvent, such as acetone and methyl ethyl ketone.

In a fluoroalcohol, the hydrocarbon chain can be as small as one or two $CH_2$ groups, such as fluoromethanol, $FCH_2OH$, or 2-fluoroethanol, $F(CH_2)_2OH$. A single fluorine atom can replace a single hydrogen atom, or multiple fluorine atoms can replace multiple hydrogen atoms. Moreover, a single hydroxyl group can replace any hydrogen atom or multiple hydroxyl groups can replace multiple hydrogen atoms. For example, the fluoroalcohol could be $F(CF_2CF_2)_nCH_2CH(OH)_2$, wherein n is 2 to 20.

Any fluoroalcohol can be used. For example, those described in U.S. Pat. Nos. 5,264,637, 6,294,704, 6,313,357, 6,392,105 and 6,410,808, each of which is incorporated herein by reference in its entirety, may be used.

A fluorinated ether, or fluoroether, can also be used as the fluorinated compound. A fluoroether is any hydrocarbon chain with an ether group ($OR_1$) and at least one fluorine atom. The hydrocarbon chain can be straight or branched, linear or cyclic, saturated or unsaturated, and can have any number of carbon atoms such as from 1 to about 50, or 2 to about 25, or 3 to about 20, or 4 to about 15 carbon atoms. The hydrocarbon chain can be unsubstituted (other than by halogen atoms) or substituted with one or more other groups, as desired. For example, a fluoroether could be a compound represented by Formula 2:

$$R_f(CH_2)_aOR_1 \qquad \text{Formula 2}$$

wherein $R_f$ is a perfluorocarbon of 1 to about 20 carbon atoms, a is 0 to 6, and $R_1$ is a linear or branched, substituted or unsubstituted, saturated or unsaturated hydrocarbon group of about 1 to about 20 carbon atoms.

For example, a fluoroether can be $F(CF_2CF_2)_nCH_2CHO(CH_2)_bCH_3$, wherein n is 2 to 20, and b is 0 to 20. Additionally, the fluoroether can be, for example, $F(CF_2CF_2)_nCH_2CHO(R_c)_bCH_3$, wherein n is 2 to 20, $R_c$ is a linear or branched, substituted or unsubstituted hydrocarbon chain, and b is 0 to 20.

Additional fluoroethers can be found, for example, in U.S. Pat. Nos. 3,689,571, 5,179,188, 6,416,683, 6,677,492 and 7,193,119, each of which is incorporated herein by reference in its entirety.

A fluorinated ester, or fluoroester, can also be used as the fluorinated compound. A fluoroester is any hydrocarbon chain with an ester group ($C(O)OR_3$) and at least one fluorine atom. The hydrocarbon chain can be straight or branched, linear or cyclic, saturated or unsaturated, and can have any number of carbon atoms such as from 1 to about 50, or 2 to about 25, or 3 to about 20, or 4 to about 15 carbon atoms. The hydrocarbon chain can be unsubstituted (other than by halogen atoms) or substituted with one or more other groups, as desired. For example, a fluoroester could be a compound represented by Formula 3:

$$R_{3a}C(O)OR_{3b}, \qquad \text{Formula 3}$$

wherein $R_{3a}$ is independently $H_2$, a straight or branched, linear or cyclic, saturated or unsaturated hydrocarbon group of about 1 to about 20 carbon atoms, $R_{3b}$ is a straight or branched, linear or cyclic, saturated or unsaturated hydrocarbon group of about 1 to about 20 carbon atoms, wherein at least one hydrogen atom in at least one of $R_{3a}$ and $R_{3b}$ is substituted with at least one fluorine atom.

For example, a fluoroester can be $F(CF_2CF_2)_nCH_2C(O)O(CH_2)_bCH_3$, wherein n is 2 to 20, and b is 0 to 20. Additionally, the fluoroester can be, for example, $F(CF_2CF_2)_nCH_2C$ $(O)O(R)_bCH_3$, wherein n is 2 to 20, and $R_c$ is a linear or branched, substituted or unsubstituted hydrocarbon chain, and b is 0 to 20.

Additional fluoroesters can be found, for example, in U.S. Pat. Nos. 4,980,501, 7,034,179, 7,053,237, 7,161,025 and 7,312,288, each of which is incorporated herein by reference in its entirety.

In embodiments, the fluorinated moiety of the fluorinated compound provides low surface energy and the alcohol, ether or ester group of the fluorinated compound chemically bonds, or cross-links, with an organic compound selected from the group consisting of urea, isocyanate and melamine. Although not limited by any theory, it is believed that the organic compound provides adhesive properties for the composition to bond to the aperture. The ideal organic compound has a low baking temperature, for example, about 80° C. to about 160° C., good adhesion to most substrates, weather resistant features, excellent hardness/film-flexibility, wide compatibility and good solubility features.

In embodiments, the organic compound is a urea, isocyanate or a melamine. Urea is generally defined as the compound represented by the formula:

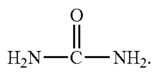

In this disclosure, urea also refers to a substituted urea. A substituted urea is a urea where one or more of the hydrogen atoms on one or more of the nitrogen atoms are substituted. Cyclic ureas may also be used. For example, a substituted urea can be

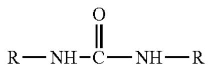 or 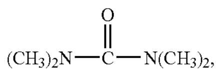

where R is a hydrogen atom or a hydrocarbon chain that is linear or branched, substituted or unsubstituted, and saturated or unsaturated. R can be further substituted with, for example, alkyl, alkenyl, alkynyl, alkoxy, cyano, carboxyl, and the like. Moreover, either or both hydrogen atoms on either or both nitrogen atoms in the urea can be substituted for a hydrocarbon chain having about 1 to about 20 carbon atoms. In this disclosure, when the organic compound is a urea, the urea could be, for example, represented by Formula 4, below.

$R_4NC(O)NR_4$, Formula 4 wherein $R_4$ is independently one or more hydrogen atoms or a hydrocarbon chain that is straight or branched, linear or cyclic, saturated or unsaturated, and can have any number of carbon atoms such as from 1 to about 50, or 2 to about 25, or 3 to about 20, or 4 to about 15 carbon atoms.

Additional ureas that are suitable in this disclosure can be found, for example, in U.S. Pat. Nos. 7,186,828, 7,220,882, 7,265,222 and 7,314,949, 7,354,933, each of which is incorporated herein by reference in its entirety.

In embodiments, isocyante can be used as the organic compound. Isocyanate, also referred to herein as polyisocyanate, is a class of materials containing the functional group —N═C═O. Formula 5 depicts an isocyanate, where $R_5$ is a hydrocarbon chain that is linear or branched, substituted or unsubstituted, and saturated or unsaturated. $R_5$ can be substituted with, for example, alkyl, alkenyl, alkynyl, alkoxy, cyano, carboxyl, and the like.

$(O)CNR_5NC(O)$. Formula 5

Any isocyante or polyisocyanate can be used (in this disclosure isocyante and polyisocyanate are interchangeable). For example, BL3475®, a blocked aliphatic isocyanate by Bayer®, has a low baking temperature and good adhesion to most substrates and weather resistant features. Under proper curing conditions, the isocyante can form urethane with the fluorinated compound, or a polyisocyanate can form a polyurethane with the fluorinated compound. An example of a reaction between a fluorinated compound and an organic compound is depicted in Reaction Scheme 1, below, where $R_f$ and $R_5$ are as defined above.

Reaction Scheme 1:

$R_fCH_2CH_2OH$ + $OCNR_5NCO$ → fluoroalcohol polyisocyanate $R_fCH_2CH_2OC(O)NHR_5NHC(O)OCH_2CH_2R_f$ polyurethane Additional isocyanates include, for example, Sumidule BL3175, Desmodule BL3475, Desmodule BL3370, Desmodule 3272, Desmodule VPLS2253 and Desmodule TPLS2134 of Sumika Bayer Urethane Co., Ltd. and the Duranate 17B-60PX, Duranate TPA-B80X and Duranate MF-K60X of Asahi Kasei Corporation.

In embodiments, the organic product can also be melamine. Melamine is a class of organic compounds based on 1,3,5-triazine-2,4,6-triamine where the amino groups are optionally substituted. Formula 6 depicts a melamine, where $R_2$ is an optional substituent of, for example, hydrogen, alkyl, alkenyl, alkynyl, alkoxy, cyano, and the like.

Formula 6:

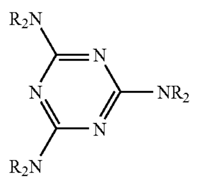

The melamine could be, for example, Cymel®303, which is a commercial grade of hexamethoxymethylmelamine by Cytec Industries. It has excellent hardness/film-flexibility, wide compatibility and solubility features. An example of the reaction of a fluoroalcohol and a substituted amide group is depicted in Reaction Scheme 2, below.

Reaction Scheme 2:

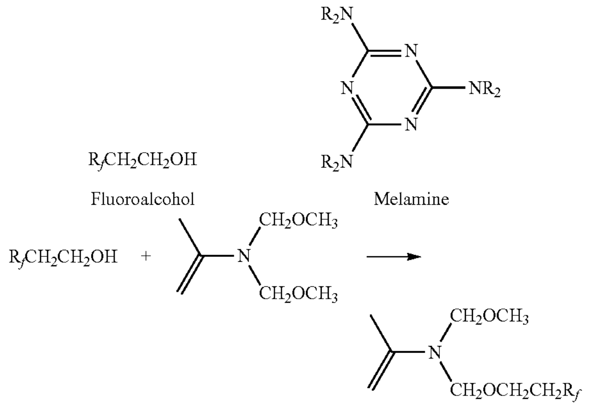

Any melamine can be used. For example, the melamines described in U.S. Pat. Nos. 6,579,980; 6,258,950; 5,721,363; 4,565,867, each of which is incorporated by reference in its entirety, can be used.

The coating compositions contain the fluorinated compound and the organic compound in a weight ratio of about 5:95 to about 75:25, or about 20:80 to about 60:40, or about 50:50.

This disclosure also provides a process of applying a coating composition to an aperture plate, comprising adding a fluorinated compound, an organic compound selected from the group consisting of a urea, an isocyanate and a melamine, and an optional catalyst, together in a solvent to form a coating composition, applying the coating composition to a base film, and curing the base film.

In addition to the fluorinated compound and organic compound, the composition can also include any other known additive or ingredient.

In the process of preparing a coating composition, a catalyst can be used to expedite the reaction between the fluorinated compound and the organic compound. The catalyst can be an acid catalyst, such as toluenesulfonic acid, or a tin catalyst, such as dibutyltin dilaurate. However, any known catalyst may be used.

In embodiments, the fluorinated compound and organic compound react in a condensation reaction, to form a condensation product on the substrate surface. For example, in the presence of the optional catalyst, the —OH group on a fluoroalcohol and a —H group on the organic compound react to liberate water and bond the fluoroalcohol and organic compound together. Similarly, for example, in the presence of the optional catalyst, the —OR group on a fluoroether or fluoroester and a —H group on the organic compound react to liberate water and bond the fluoroether or fluoroester and organic compound together.

In the process for preparing the coating composition, the fluorinated compound, organic compound and optional catalyst are mixed in a solvent or mixture of solvents, such as a ketone solvent, at a total solid content of about 5-80% by volume. Any solvent can be used, for example, methyl ethyl ketone, acetone, THF, toluene, xylene or the like.

Next, the coatings are applied to a base film, such as a polyimide base film, using any suitable coating process readily available in the art. For example, the coating can be applied using a bar coating block with a gap height. Then, the coating composition is cured at a temperature of about 70° C. to about 1200° C., or about 80° C. to about 110° C., or about 90° C. to about 100° C., and held there for about 5 to about 15 minutes, or about 10 minutes, and then raised to about 120° C. to about 150° C., or about 130° C. to about 140° C. and held there for about 25 to about 35 minutes, or about 30 minutes.

Any polyimide base film can be used, such as Kapton® from DuPont, Upilex® from Ube Industries. Other polyimide base films include, for example thermoplastic polyimide film ELJ100 from DuPont, to form the desired ink jetting apparatus or other features.

After the coating composition is cured on the base film, the aperture plate can be cut with a laser, for example to form the desired ink setting aperture or other features. Thus, the coating composition can be cured onto the base film in a continuous process.

A base film, such as a polyimide base film, with this coating composition can be carried out with a web-based continuous coating process. This can eliminate current batch evaporation process. This is a significant cost-cutting and time-saving opportunity for the production of SIJ printheads.

The printhead in this disclosure can be of any suitable configuration without restriction. The ink jet printhead preferably comprises a plurality of channels, wherein the channels are capable of being filled with ink from an ink supply and wherein the channels terminate in nozzles on one surface of the printhead, the surface of which is coated with the hydrophobic laser abatable fluorine-containing graft copolymer as discussed above. Suitable ink jet printhead designs are described in, for example, U.S. Pat. Nos. 5,291,226, 5,218, 381, 6,357,865, and 5,212,496, and U.S. Patent Application Publication No. 2005/0285901, all of which are incorporated herein by reference in their entireties. Further explanation of the ink jet printhead and the remaining well known components and operation thereof is accordingly not undertaken again in the present application.

Examples are set forth herein below and are illustrative of different compositions and conditions that can be utilized in practicing the disclosure. All proportions are by weight unless otherwise indicated. It will be apparent, however, that the disclosure can be practiced with many types of coating compositions and can have many different uses in accordance with the disclosure above and as pointed out hereinafter.

EXAMPLES

Example 1

A coating composition was formulated with the fluoroalcohol Zonyl® BA and the isocyanate BL3475® at about 40:60 ratio in weight and with about 1% toluenesulfonic acid catalyst at a total solid content of about 10-15% in volume in methyl ethyl ketone. Coatings were applied to a DuPont Kapton® polyimide base film using a bar coating block with a gap height of about 10-15 μm. The cured films were estimated to be about 1-2 μm. Curing was done first at about 90-100° C. for about 10 minutes, and then raised to 130-140° C. and for an additional 30 minutes.

The surface energy was analyzed using water contact angle measurements and the results show that the protected coatings have an average of 120°, in contrast to 90° for the polyimide base films. This indicated that the coating composition provided a low surface energy as compared to the polyimide base film without the coating composition.

The coating composition was then reheated in an oven at about 225° C. for about 60 minutes to stress the films at a harsher condition than in the usual manufacturing procedures (about 200° C. for about 20-30 minutes) of the printheads. The reheated films were then re-measured for water contact angle. The angles decreased by an average of about 10-12 degrees, but were still substantially higher than the base films. A summary of the contact angle measurements is shown in Table 1.

The adhesion between the coating composition and base polyimide appeared to be fine, and there was no apparent visual separation when attempting to scratch the coating composition off with a blade. Moreover, solvent resistance tests using organic solvents, such as methylene chloride and THF, also showed that the films stayed intact with no apparent degradations to the coatings. Overall, the coating composition demonstrated several good attributes of a low surface energy protective coating composition. Scratch resistance of the protective coatings were determined by the pencil hardness test and the results suggest that there is no difference in hardness between the protective coatings and polyimide substrates (Table 1).

TABLE 1

| | Water Contact Angle after curing at 130°-140° C. for 20 min. | Water Contact Angle after curing at 225° C. for 60 min. | Pencil Hardness |
|---|---|---|---|
| Polyimide with Fluoroalcohol/Isocyanate Coating Composition | 120° | 110° | 1H |
| Polyimide | 90° | 90° | 1H |

Example 2

A coating composition was formulated with the fluoroalcohol Zonyl® BA and the melamine Cymel® 303 at about 35:65 ratio in weight and with about 1% toluenesulfonic acid catalyst at a total solid content of about 10-15% in volume in methyl ethyl ketone. The coatings were applied to a DuPont Kapton® polyimide base film using a bar coating block with a gap height of about 10-15 μm. The cured films were estimated to be about 1-2 μm. Curing was done first at about 90-100° C. for about 10 minutes, and then raised to 130-140° C. and for an additional 30 minutes.

The surface energy was analyzed using water contact angle measurements and the results show that the protected coatings have an average of 115°, in contrast to 90° for the polyimide base films.

The coating composition was then reheated in an oven at about 225° C. for about 60 minutes to stress the films at a harsher condition than in the usual manufacturing procedures (about 200° C. for about 20-30 minutes) of the printheads. The reheated films were then re-measured for water contact angle. The angles decreased by an average of about 10 degrees, but were still substantially higher than the base films. A summary of the contact angle measurements is shown in Table 2.

The adhesion between the coating composition and base polyimide appeared to be fine, and there was no apparent visual separation when attempting to scratch the coating composition off with a blade. Moreover, solvent resistance tests using organic solvents, such as methylene chloride and THF, also showed that the films stayed intact with no apparent degradations to the coatings. Overall, the coatings demonstrated several good attributes of a low surface energy protective coating composition. Scratch resistance of the protective coatings were also determined by the pencil hardness test and the results suggest that there is no difference in hardness between the protective coatings and polyimide substrates (Table 2).

TABLE 2

| | Water Contact Angle after curing at 130°-140° C. for 20 min. | Water Contact Angle after curing at 225° C. for 60 min. | Pencil Hardness |
|---|---|---|---|
| Polyimide with Fluoroalcohol/Melamine Coating Composition | 115° | 107° | 1H |
| Polyimide | 90° | 90° | 1H |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An aperture plate coated with a composition comprising a fluorinated compound and an organic compound, wherein the organic compound is a melamine;

the aperture plate is a polyimide aperture plate;

the ratio of the fluorinated compound to the organic compound is about 20:80 to about 60:40; and the composition forms a uniform coating on the polyimide aperture plate that is between about 1 μm and about 2 μm in thickness.

2. The aperture plate according to claim 1, wherein the fluorinated compound is selected from the group consisting of a fluoroalcohol, fluoroether and fluoroester.

3. The aperture plate according to claim 1, wherein the fluorinated compound is a compound of Formula 1, $R_f(CH_2)_a OH$, wherein $R_f$ is a linear or branched, saturated or unsaturated hydrocarbon group of 1 to 20 carbon atoms having at least one hydrogen atom replaced with a fluorine atom; and a is 0 to 6.

4. The aperture plate according to claim 1, wherein the fluorinated compound is $F(CF_2CF_2)_nCH_2CH_2OH$, wherein n is 2 to 20.

5. The aperture plate according to claim 1, wherein the fluorinated compound is a compound of the formula $R_f(CH_2)_a OR_1$, wherein $R_f$ is a perfluorocarbon of 1 to about 20 carbon atoms, a is 0 to 6, and $R_1$ is a linear or branched, substituted or unsubstituted, saturated or unsaturated hydrocarbon group of about 1 to about 20 carbon atoms.

6. The aperture plate according to claim 1, wherein the fluorinated compound is a compound of the formula $R_{3a}C(O)OR_{3b}$, wherein $R_{3a}$ is independently $H_2$, a straight or branched, linear or cyclic, saturated or unsaturated hydrocarbon group of about 1 to about 20 carbon atoms, $R_{3b}$ is a straight or branched, linear or cyclic, saturated or unsaturated hydrocarbon group of about 1 to about 20 carbon atoms, wherein at least one hydrogen atom in at least one of $R_{3a}$ and $R_{3b}$ is substituted with at least one fluorine atom.

7. The aperture plate according to claim 1, wherein the organic compound is a hexamethoxymethylmelamine.

8. The aperture plate according to claim 1, wherein the fluorinated compound is a fluoroalcohol of formula $F(CF_2CF_2)_nCH_2CH_2OH$, wherein n is 2 to 20, and the organic compound is a hexamethoxymethylmelamine.

9. The aperture plate according to claim 1, wherein the fluorinated compound is a fluoroalcohol and wherein a ratio of the fluoroalcohol to the organic compound is about 40:60 to about 60:40.

10. The aperture plate according to claim 1, wherein the fluorinated compound is a fluoroalcohol of the formula $F(CF_2CF_2)_nCH_2CH(OH)_2$, wherein n is 2 to 20.

11. A process of applying a coating composition to an aperture plate, comprising adding a fluorinated compound, an organic compound, and an optional catalyst together in a solvent or a mixture of solvents to form a coating composition, applying the coating composition to a base film, and curing the base film;

wherein the organic compound is a melamine;

the aperture plate is a polyimide aperture plate:

the ratio of the fluorinated compound to the organic compound is about 20:80 to about 60:40;

the composition forms a uniform coating on the polyimide aperture plate that is between about 1 μm and about 2 μm in thickness.

12. The process according to claim 11, wherein the base film is a polyimide base film.

13. The process according to claim 11, wherein the fluorinated compound is a fluoroalcohol of the formula $F(CF_2CF_2)_n CH_2CH_2OH$, wherein n is 2 to 20.

14. The process according to claim 11, wherein the organic compound is a hexamethoxymethylmelamine.

15. The process according to claim 11, wherein the optional catalyst is utilized and is an acid catalyst or a tin catalyst.

16. The process according to claim 11, wherein the optional catalyst is utilized and is toluenesulfonic acid or dibutyltin dilaurate.

17. The process according to claim 11, wherein the solvent or mixture of solvents comprises a ketone solvent.

18. The process according to claim 11, wherein the curing includes a first heating at a temperature of about 80° C. to about 110° C. for about 5 minutes to about 15 minutes, and a second heating at a temperature of about 120° C. to about 150° C. for about 25 minutes to about 35 minutes.

19. An aperture plate coated with a composition comprising:

a fluoroalcohol of formula $F(CF_2CF_2)_nCH_2CH_2OH$, wherein n is 2 to 20, and hexamethoxymethylmelamine, wherein the aperture plate is a polyimide aperture plate;

a ratio of the fluoroalcohol to hexamethoxymethylmelamine is about 40:60 to about 60:40;

the composition forms a uniform coating on the polyimide aperture plate that is between about 1 μm and about 2 μm in thickness; and the water contact angle of the aperture plate coated with the composition is from about 107° to about 120°.

* * * * *